United States Patent
Barak et al.

(10) Patent No.: US 8,116,809 B2
(45) Date of Patent: Feb. 14, 2012

(54) METHOD AND APPARATUS OF MULTIPLE ENTITY WIRELESS COMMUNICATION ADAPTER

(75) Inventors: Amit Barak, Haifa (IL); Yuval Bachrach, Haifa (IL); Marc Jalfon, Zichron Yaakov (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1192 days.

(21) Appl. No.: 11/212,581

(22) Filed: Aug. 29, 2005

(65) Prior Publication Data

US 2007/0049339 A1    Mar. 1, 2007

(51) Int. Cl.
*H04M 1/00* (2006.01)
(52) U.S. Cl. ............... 455/552.1; 455/553.1; 370/338
(58) Field of Classification Search .......... 455/552.1, 455/553.1; 370/338
See application file for complete search history.

(56) References Cited

U.S. PATENT DOCUMENTS

| | | | |
|---|---|---|---|
| 7,586,949 B1 * | 9/2009 | Barany et al. | 370/474 |
| 2002/0137472 A1 * | 9/2002 | Quinn et al. | 455/90 |
| 2002/0176510 A1 * | 11/2002 | Laroia | 375/267 |
| 2004/0199845 A1 * | 10/2004 | Tanoue | 714/746 |
| 2005/0064872 A1 * | 3/2005 | Osseiran et al. | 455/452.1 |
| 2006/0050742 A1 * | 3/2006 | Grandhi et al. | 370/506 |
| 2006/0075073 A1 * | 4/2006 | Bichot | 709/220 |
| 2006/0111042 A1 * | 5/2006 | Pitchers | 455/20 |
| 2006/0133415 A1 * | 6/2006 | Mueller | 370/466 |
| 2006/0215601 A1 * | 9/2006 | Vleugels et al. | 370/328 |
| 2007/0014267 A1 * | 1/2007 | Lam et al. | 370/338 |

OTHER PUBLICATIONS

Chandra et al.: "MultiNet: Connecting to Multiple IEEE 802.11 Networks Using a Single Wireless Card", Proceedings of IEEE Infocom 2004, Mar. 2004.

* cited by examiner

*Primary Examiner* — Nick Corsaro
*Assistant Examiner* — Amanuel Lebassi
(74) *Attorney, Agent, or Firm* — Shiloh et al.

(57) ABSTRACT

Embodiments of the present invention provide a method and apparatus for a multiple-entity wireless communication adapter, including at least a first connection module to communicate first signal traffic corresponding to a basic service set station entity, a second connection module to communicate second signal traffic corresponding to an entity that is not a basic service set station, and a shared physical layer able to process both the first and the second signal traffic. Additional features are described and claimed.

21 Claims, 2 Drawing Sheets

METHOD AND APPARATUS OF MULTIPLE ENTITY WIRELESS COMMUNICATION ADAPTER

BACKGROUND OF THE INVENTION

"IEEE Std 802.11, 1999 Edition (ISO/IEC 8802-11: 1999)", defines a set of standards for wireless local area network (WLAN) communication. A station (STA) may be any device that includes wireless functionality according to the 802.11 standards, e.g., a laptop personal computer (PC), a handheld device such as a personal digital assistant (PDA) or mobile phone, or a peripheral device such as a printer or scanner, and may be mobile, portable, or stationary. A station that maintains an independent timing synchronization function (TSF) and allows other stations to connect to it, forming a network, may be referred to as an access point (AP). An elementary network architecture including an AP and at least one STA may be referred to as a basic service set (BSS).

An AP may be a dedicated device with additional functionality such as, for example, providing a bridge to wired network infrastructure, or arbitrating communication of stations in the WLAN, or it may provide only temporary AP functionality through a combination of hardware and software. A group of stations operating in peer-to-peer communication with each other form an independent basic service set (IBSS), or ad-hoc network. When a station operates as an IBSS STA, it may not be able to connect to an infrastructure access point.

Other standards, for example, "IEEE Std 802.15.1-2002", define a set of standards for wireless personal area network (WPAN) communication. A personal area network (PAN) connection differs from a local area network (LAN) connection in several aspects, including, for example, that a PAN may usually operate via point-to-point connections, may not require authentication to infrastructure equipment, and may not necessarily provide the routing capabilities usually offered by a LAN.

A conventional use case network may include concurrent local and personal area wireless networks. For example, a laptop or notebook computer may connect to, e.g., a wireless bridge or a remote printer, over a WLAN and to a peripheral device, e.g., a projector or a storage device, over a WPAN.

One method for implementing a concurrent wireless local and personal area network is to equip a device with two independent wireless adapters, which may be of the same wireless protocol or of two different wireless protocols, for example, WLAN over 802.11 BSS mode and WPAN over 802.15. This may involve doubling of physical resources such as, for example, baseband processors and/or radio frequency circuitry.

Another option is to utilize the same adapter for both WLAN and WPAN by allowing the user to manually switch between the two modes. For example, an 802.11 network interface card (NIC) may be used as a WLAN device in BSS mode and may be manually switched to operate as a PAN device in IBSS mode. However, a manually switched adapter may only connect to one network, for example, either a PAN or a LAN, at any given time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
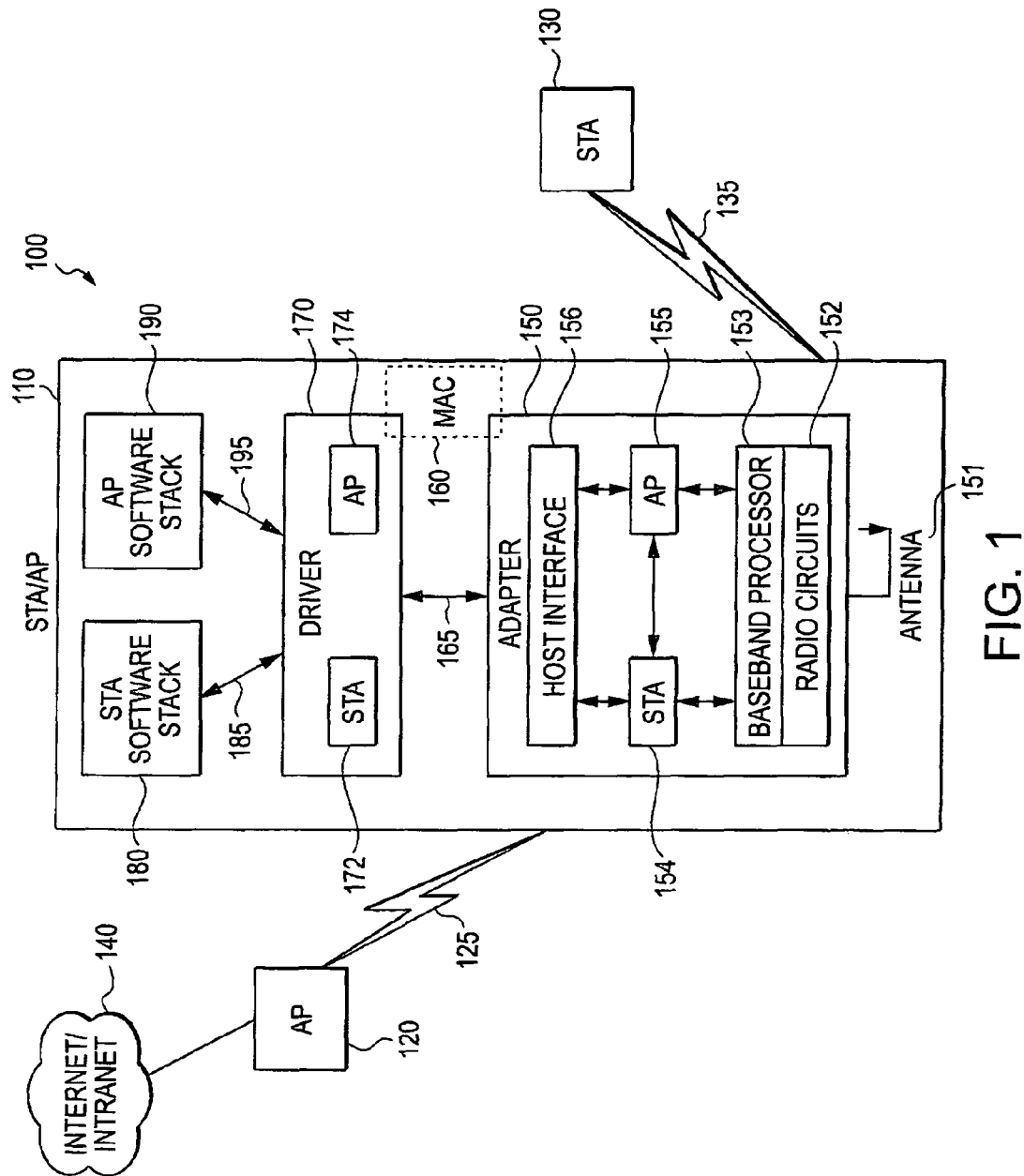
FIG. 1 is a schematic illustration of a wireless communication system including one or more communication devices having a dual function wireless adapter according to a demonstrative embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal frequency-division multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), local area network (LAN), wide area network (WAN), or a global communication network, for example, the Internet.

Some embodiments of the invention provide a method and apparatus for operating concurrent station (STA) and access point (AP) entities substantially simultaneously over a shared baseband processor and radio frequency circuits. In a wireless communication system, it may be desirable for a device to maintain concurrent association and/or signal traffic with local area network (LAN) and personal area network (PAN) devices. For example, it may be desirable to maintain concurrent association and/or signal traffic with APs of a WLAN, i.e., to operate as a basic service set (BSS) STA entity, while maintaining concurrent association and/or traffic with peripheral devices, i.e., to operate as an independent basic service set (IBSS) STA or BSS AP entity of a WLAN or WPAN.

Reference is made to FIG. 1, which schematically illustrates a wireless communication system 100 including local area and personal area network elements in accordance with a demonstrative embodiment of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Although the invention is not limited in this respect, wireless communication system 100 may include at least one multiple entity (multi-entity) device, for example, dual-entity STA/AP device 110, an access point (AP) 120 of a wireless network 125, for example, a WLAN, and a peripheral station 130 of an additional network 135, for example, a WPAN. STA/AP 110 may be able to maintain concurrent association and/or signal traffic with AP 120 over a link of WLAN 125, e.g., to operate as a STA entity, while maintaining concurrent association and/or signal traffic with STA 130 over a link of WPAN 135, e.g., to operate as an AP or IBSS STA entity. In addition, a plurality of dual-entity devices 110 may be in communication with one another and/or with a wider intranet or the Internet 140 via AP 120 over a link of WLAN 125. Multi-entity devices 110 may also be in communication with one another via a link of a WPAN.

Although the invention is not limited in this respect, dual-entity STA/AP 110 may include a STA entity software stack 180, an AP entity software stack 190, a driver 170, and a multi-entity adapter, e.g., dual-entity adapter 150. Dual-entity adapter 150 may be associated with a radio frequency antenna 151, e.g., a dipole antenna, omnidirectional antenna, semi-omnidirectional antenna, or any other antenna suitable for transmission and/or reception of radio frequency signals. Software stacks 180 and 190 may include, e.g., software for implementing network protocols of the application layer, presentation layer, session layer, transport layer, and network layer of the seven-layer Open Systems Interconnect (OSI) model, as known in the art. For example, a network application in STA stack 180 may generate data to be transmitted to a network application in intranet 140, via AP 120 over a link of LAN 125, and a network application in AP stack 190 may generate data to be transmitted to a network application in STA 130 over a link of PAN 135. In another example, AP software stack 190 may include networking software with routing capabilities to allow range extension of AP 120 or sharing of Internet connection 140. According to the appropriate network protocols, data packets 185 from stack 180 and data packets 195 from stack 190 may be transmitted to driver 170. In accordance with some demonstrative embodiments of the invention, during transmission driver 170 may provide an output in the form of data frames 165 to be further processed by adapter 150. During reception, driver 170 may receive data frames 165 from adapter 150 to be processed into data packets for software stacks 180 and 190.

According to some demonstrative embodiments of the invention, dual-entity STA/AP 110 may include a media access controller (MAC) 160. It will be appreciated by those skilled in the art that MAC 160 may include mechanisms to control data transfer, including, for example, to transmit and receive frames, to delimit frames, to check for errors, to insert headers with MAC addresses for routing, to route frames according to MAC addresses, and to control timing and/or permissions of transmit queues of data and management frames. MAC 160 may be implemented by any combination of hardware and/or software in different parts of STA/AP 110, for example, parts of driver 170 and/or adapter 150, as explained in detail below.

According to some demonstrative embodiments of the invention, driver 170 may include, for example, a STA upper MAC 172 to process data packets 185 and an AP upper MAC 174 to process data packets 195. For example, upper MACs 172 and 174 may also be known in the art as 802.11 higher layer MACs (HMAC). It will be appreciated by those skilled in the art that driver 170 perform tasks including, for example, translation of frames between different network protocols, or operations that are not timing-critical, such as rate scaling or reassembly of fragmented received frames. According to some demonstrative embodiments of the invention, upper MACs 172 and 174 may be implemented as separate modules or as components of the same module. In accordance with other demonstrative embodiments of the invention, the functionality of upper MACs 172 and 174 may be included in components of adapter 150. Although the invention is not limited in this respect, driver 170 may be implemented as software, hardware, firmware, embedded software, and/or any suitable combination of software and hardware.

According to some demonstrative embodiments of the invention, the multi-entity adapter, e.g., dual-entity adapter 150, may be capable of providing functionality for a STA entity, an AP entity, or concurrent STA/AP entity. In addition, the multi-entity adapter may be able to maintain concurrent association with multiple networks, e.g., an 802.11 WLAN, an 802.15 WPAN, and/or any other suitable network as is known in the art, and may be referred to as a multiple networks adapter. Dual-entity adapter 150 may include a STA entity connection module 154, e.g., a STA lower MAC, as is known in the art, and an AP entity connection module 155, e.g., an AP lower MAC, as is known in the art, to handle timing-critical MAC operations, as explained in detail below. In accordance with embodiments of the invention, connection modules 154 and 155 may operate over a shared baseband processor 153 and radio frequency circuits 152, as described in detail below. Dual-entity adapter 150 may also include a host interface module 156 to provide interface between the driver and adapter. The host interface module may handle transfer of data and commands between driver 170 and connection modules 154 and 155, e.g. it may act as a bus master and initiate transactions over interface 165, or it may respond to transactions initiated by driver 170, in which case host interface module 156 may act as a bus target or slave.

Although the invention is not limited in this respect, dual-entity adapter 150 may transmit and receive management, control, and data frames to and from both STA and AP entities. The dual-entity adapter may interleave STA and AP data and management frames 165 using the same baseband and radio components. Although the invention is not limited in this respect, connection modules 154 and 155 may, for example, provide lower MAC functionality and may perform timing-critical MAC tasks to facilitate transmitting and receiving of data signals to and from host interface 156 and a physical layer (PHY), which may include baseband processor 153 and radio circuits 152. In accordance with different demonstrative embodiments of the invention, STA entity connection module 154 and AP entity connection module 155 may be implemented using hardware, software, and/or any suitable combination of software and hardware, either within separate lower MACs or within the same lower MAC, and may also include additional functionality of MAC 160, for example, the non-timing critical functionality of upper MACs 172 and 174 described above.

Although the invention is not limited in this respect, during transmission host interface 156 may transmit data to connection modules 154 and 155, e.g., lower MACs, to be transmitted to the physical layer. It will be appreciated by those with skill in the art that, in accordance with network protocols, lower MACs 154 and 155 may wait for a clear channel indication, for example, reception of a clear channel assessment (CCA) signal from the physical layer, before transmitting. In accordance with embodiments of the invention, the CCA signal may be responsive to transmissions of one or more lower MAC modules within the multi-entity adapter. For example, a CCA signal entering module 155 may be a combination, e.g., a logical OR, of the CCA signal from the physical layer and a transmit indication from module 154. Similarly, a CCA signal entering module 154 may be a combination, e.g., a logical OR, of the CCA signal from the physical layer and a transmit indication from module 155. In addition, lower MAC modules 154 and 155 may handle aspects of the transmission flow such as, for example, handshake frames, acknowledgement frames, retransmission of frames, and request-to-send (RTS)-clear-to-send (CTS) conversation.

Although the invention is not limited in this respect, during reception lower MAC modules 154 and 155 may send a "receive enable" signal to the physical layer in order to activate the receiver parts of the physical layer, e.g., radio circuits 152 and baseband processor 153. Antenna 151 may receive radio signals containing data frames for both STA and AP entities of dual-entity STA/AP 110. Radio circuits 152 and baseband processor 153 may convert the received radio signals into a digital data stream for further processing by connection modules 154 and 155, which may be, for example, lower MACs. Lower MACs 154 and 155 may perform functions including, for example, cyclic redundancy checks (CRC), transmission of acknowledgement frames, and MAC address filtering. According to demonstrative embodiments of the invention, connection modules 154 and 155 may, in addition, receive data streams transmitted by other connection modules within the multi-entity adapter, in addition to receiving data streams from the physical layer.

Although the invention is not limited in this respect, the multi-entity adapter, e.g., a multiple networks adapter, may associate and authenticate to an access point, e.g., AP 120 of a WLAN, and transfer data to and from the access point, as a STA entity. During that time it may also establish a BSS as an AP entity and allow other stations, e.g., STA 130 of a WPAN, to associate and authenticate to the BSS, and to transfer data to and from the AP upper and lower MACs 174 and 155, respectively. In accordance with embodiments of the invention, the multi-entity adapter may implement an AP, but may add or remove some features from a standard access point features list. For example, peripheral devices may connect to dual-entity adapter 150 even if they do not have access to WLAN infrastructure. Alternatively, dual-entity adapter 150 may also be configured to require infrastructure LAN access rights from peripherals. Access rights may be managed by AP lower MAC 155, AP upper MAC 174, AP software stack 190, or by a combination thereof.

Although the invention is not limited in this respect, the multi-entity adapter may transmit and receive all frames, including LAN and PAN management and data frames, on a single channel. The associated MAC 160 may control the timing of the STA and AP entities such that the STA entity may maintain connection and data traffic with a network AP, e.g., AP 120, while the AP entity may send beacons and keep PAN device, e.g., peripheral STA 130, associations and signal traffic active, as explained in detail in the examples below. In an alternative embodiment of the invention, the multi-entity adapter may transmit and receive management and data frames for the STA entity on one channel, and for the AP entity on a different channel.

Figure 2:
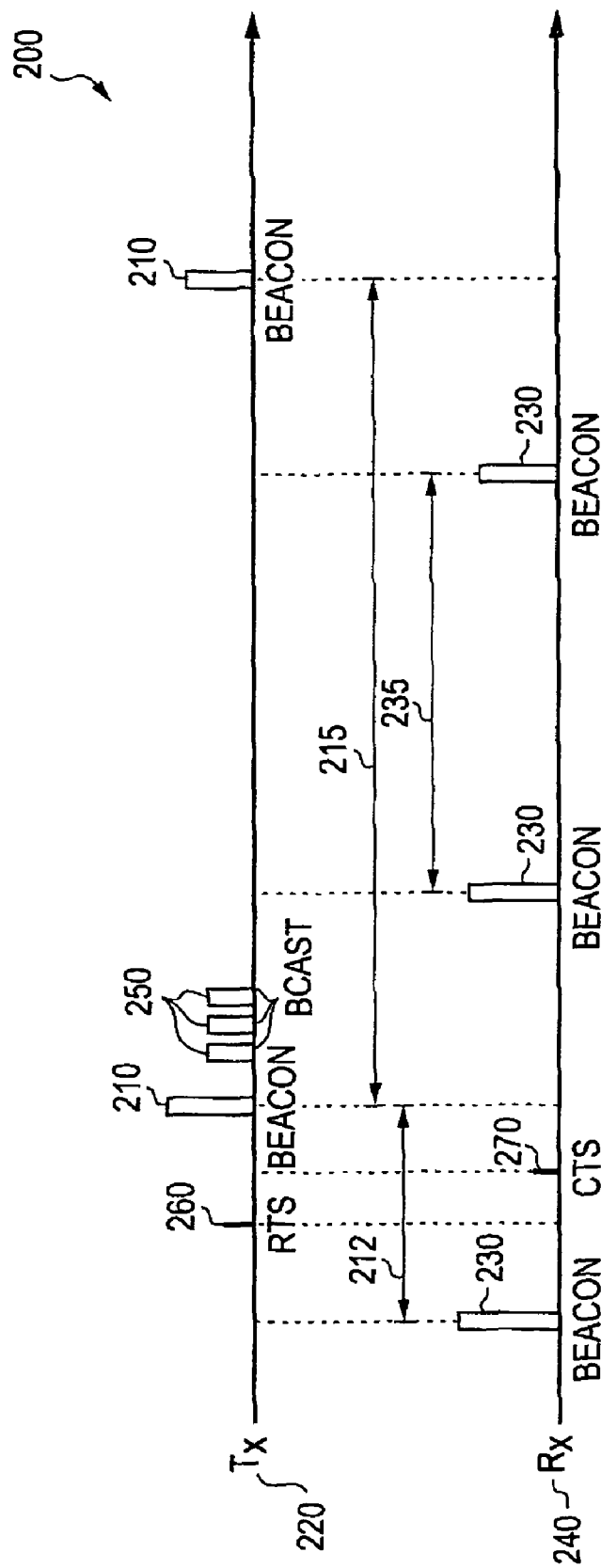
FIG. 2 is a schematic illustration of a timing diagram helpful in demonstrating control of concurrent local area and personal area network signal traffic over a shared channel according to a demonstrative embodiment of the invention.

Reference is made to FIG. 2, which schematically illustrates a timing diagram helpful in demonstrating control of concurrent local area and personal area network signal traffic over a shared channel 200 according to one demonstrative embodiment of the invention. Although the invention is not limited in this respect, channel 200 may carry signal traffics, including management frames such as, e.g., beacons, probe requests, and probe responses; control frames such as, e.g., request-to-send (RTS) and clear-to-send (CTS); and data frames such as, e.g., broadcasts or multicasts; for an AP entity and a STA entity, which may be concurrently associated with a WLAN and a WPAN. For example, channel 200 may carry signal traffics transmitted and received via antenna 151 and associated with dual-entity adapter 150, which may be a multiple networks adapter, and dual-entity STA/AP 110, as described above with reference to FIG. 1. A transmission timeline 220 for the AP entity and a reception timeline 240 for the STA entity are illustrated.

According to some demonstrative embodiments of the invention, the STA entity of the dual-entity STA/AP may receive periodic beacons 230 from an infrastructure AP over a LAN. Although the invention is not limited in this respect, the AP entity of the dual-entity STA/AP may transmit periodic beacons 210 over a PAN in such as a manner as not to collide with beacons 230, or any other management frames, that may be received by the STA entity. For example, LAN beacons 230 may have an interval 235 of 100 ms and PAN beacons 210 may be transmitted with an interval 215 of, e.g., 100 ms, 200 ms, or any duration that is a multiple of interval 235, but with a shift 212 of, e.g., 50 ms, to avoid collision. The timing of beacons 210 and 230 may be synchronized according to their respective target beacon transmit time (TBTT), as is known in the art.

In addition, according to some demonstrative embodiments of the invention, the dual-entity STA/AP may utilize a request-to-send/clear-to-send (RTS/CTS) mechanism, as is known in the art, to protect against collision of beacons and or data frames with other signal traffic. The AP entity may transmit a RTS signal 260 to associated stations, and may receive a CTS signal 270 from an active station in response. Although the invention is not limited in this respect, the AP entity may transmit PAN beacon 210 and PAN data frames 250 after receiving CTS 270.

According to some demonstrative embodiments of the invention, the AP entity of the dual-entity STA/AP may transmit data frames 250 in multicast, broadcast, or unicast modes to associated stations. Data frames 250 may be transmitted to active associated stations subject to limitations of the existing media access protocol. For example, when an associated station is in power save (PS) mode, the AP entity may buffer data frames 250 for transmission following a STA wakeup event such as, e.g., a delivery traffic indication message (DTIM) signal. Although the invention is not limited in this respect, the multi-entity adapter, e.g., a multiple networks adapter, may receive data, control, and management frames via a link of a first network whenever it is not transmitting via a link of a second network, as an AP entity or as a STA entity. In addition, the dual-entity adapter may receive frames whenever the STA entity is not in PS mode.

According to some demonstrative embodiments of the invention, the dual-entity STA/AP may cease to send beacons 210 if no active stations are associated with the AP entity, i.e., the dual-entity STA/AP may operate as a BSS STA entity when there is no call to operate as a BSS AP or IBSS STA. For example, the dual-entity STA/AP may perform active scanning, as known in the art, and may monitor for probe requests from stations in search of an AP, and may answer with a probe response to indicate availability. In accordance with demonstrative embodiments of the invention, beacon 210 may be transmitted after at least one transmission trigger is received, for example, an association request from a STA, a proprietary data frame, or a user-generated signal enabling AP functionality. Although the invention is not limited in this respect, the dual-entity STA/AP may avoid entering PS mode while at least one active STA is associated.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. An apparatus comprising:
a multiple-entity wireless communication adapter, including at least a first connection module to facilitate transmission and reception of data corresponding to a basic service set station entity, and a second connection module to facilitate transmission and reception of data corresponding to a non-basic service set station;
a shared physical layer to process data corresponding to said basic service set station entity and said non-basic service set station entity; and
a media access controller able to control flow of data between said physical layer and said first and second connection modules, wherein said media access controller comprises a shared media access controller component configured to interleave frames corresponding to said basic service set with frames corresponding to said non-basic service set.

2. The apparatus of claim 1, wherein said media access controller comprises:
a lower media access controller to control timing-critical tasks relating to said frames corresponding to said basic service set and said frames corresponding to said non-basic service set.

3. The apparatus of claim 1, further comprising:
a local area network software stack associated with said first connection module to process data carried by said frames corresponding to said basic service set.

4. The apparatus of claim 1, wherein said second connection module comprises a basic service set access point connection module to communicate access point signals.

5. The apparatus of claim 4, further comprising:
a personal area network software stack associated with said second connection module to process data carried in said frames corresponding to said non-basic service set.

6. The apparatus according to claim 1, wherein said shared media access controller is to interleave said frames corresponding to said basic service set and said frames corresponding to said non-basic service set by performing a logical OR operation between a signal of said frames corresponding to said basic service set and a signal of said frames corresponding to said non-basic service set.

7. The apparatus according to claim 1, wherein said shared media access controller is to interleave said frames corresponding to said basic service set with said frames corresponding to said non-basic service set by transmitting periodic beacon signals to be carried in said frames corresponding to said non-basic service set with a target beacon transmit time which is shifted relative to a target beacon transmit time of received periodic beacons carried in said frames corresponding to said basic service set.

8. The apparatus according to claim 7, wherein said shared media access controller is further to transmit a first beacon of said periodic beacons in response to at least one received transmission trigger signal carried in said frames corresponding to said non-basic service set.

9. A method comprising:
communicating first signal traffic corresponding to a basic service set station entity and second signal traffic corresponding to an entity that is not a basic service set station;
processing both said first and said second signal traffics using a shared physical layer; and
controlling, by a shared media access controller component of a media access controller, said first signal traffic and said second signal traffic over said shared physical layer, wherein controlling comprises interleaving said first and second signal traffics by interleaving frames corresponding to said basic service set with frames corresponding to said non-basic service set.

10. The method of claim 9, wherein interleaving comprises:
performing a logical OR operation between a signal of said first signal traffic and a signal of said second signal traffic.

11. The method of claim 9, wherein interleaving comprises:
transmitting periodic beacon signals to be carried in said second signal traffic with a target beacon transmit time which is shifted relative to a target beacon transmit time of received periodic beacons carried in said first signal traffic.

12. The method of claim 11, further comprising:
transmitting a first beacon of said periodic beacons in response to at least one received transmission trigger signal carried in said second signal traffic.

13. The method of claim 9, further comprising:
transmitting and receiving said first and second signal traffics over a shared radio channel.

14. A wireless communication system comprising:
a multiple-entity wireless communication device comprising:
an adapter, including at least a first connection module to communicate first signal traffic corresponding to a basic service set station entity, a second connection module to communicate second signal traffic corresponding to an entity that is not a basic service set station;
a shared physical layer to process both said first and said second signal traffics; and
a media access controller able to control the flow of said first and second signal traffics between said physical layer and said first and second connection modules, wherein said media access controller comprises a shared media access controller component configured to control both said first and said second signal traffics by interleaving frames corresponding to said basic service set with frames corresponding to said non-basic service set; and
a dipole antenna to transmit and receive signals corresponding to said first and second signal traffics.

15. A wireless communication system according to claim 14, further comprising:
one or more additional wireless communication devices to communicate with said multiple-entity wireless communication device over a link of a wireless communication network.

16. A wireless communication system according to claim 15, wherein said wireless communication network is a wireless local area network.

17. A wireless communication system according to claim 15, wherein said wireless communication network is a wireless personal area network.

18. A wireless communication system according to claim 14, wherein said second connection module is a basic service set access point connection module to communicate access point signals.

19. The wireless communication system according to claim 14, wherein said shared media access controller is to interleave said first and second signal traffics by performing a logical OR operation between a signal of said first signal traffic and a signal of said second signal traffic.

20. The wireless communication system according to claim 14, wherein said shared media access controller is to interleave said first and second signal traffics by transmitting periodic beacon signals to be carried in said second signal traffic with a target beacon transmit time which is shifted relative to a target beacon transmit time of received periodic beacons carried in said first signal traffic.

21. The wireless communication system according to claim 20, wherein said shared media access controller is further to transmit a first beacon of said periodic beacons in response to at least one received transmission trigger signal carried in said second signal traffic.

* * * * *